March 28, 1961     J. F. ROESEL, JR., ET AL     2,977,550
ELECTRICAL INVERTER CIRCUITS
Filed Nov. 5, 1957
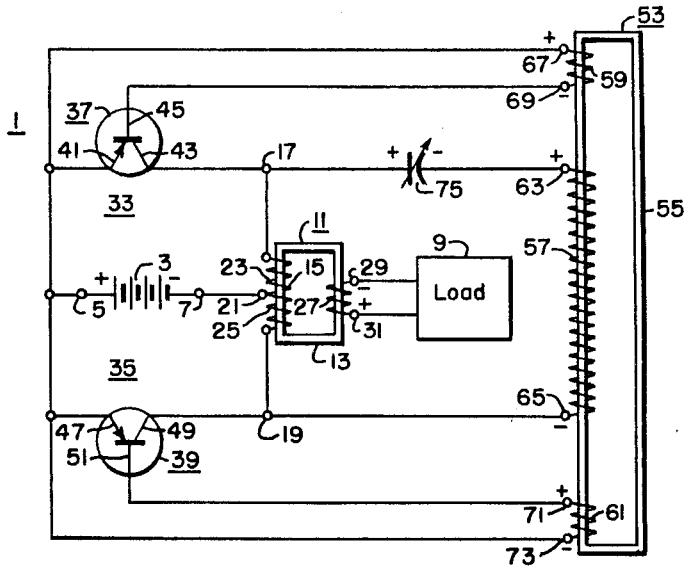
INVENTORS
John F. Roesel, Jr. and
Robert W. Lucky.
BY
ATTORNEY

United States Patent Office 2,977,550
Patented Mar. 28, 1961

2,977,550
ELECTRICAL INVERTER CIRCUITS
John F. Roesel, Jr., and Robert W. Lucky, Pittsburgh, Pa., assignors to Westinghouse Electric Corporation, East Pittsburgh, Pa., a corporation of Pennsylvania
Filed Nov. 5, 1957, Ser. No. 694,596
3 Claims. (Cl. 331—113)

This invention relates to electrical inverter circuits and has particular relation to inverter circuits of the self-excited type.

According to the present invention, an electrical inverter circuit of improved construction is provided for producing an alternating output quantity from a direct input quantity having a frequency which is substantially independent of the magnitude of the input quantity and which is variable over a wide range. Although the invention has many and varied applications, it will be described in connection with an inverter circuit of the self-excited type.

In the present invention an inverter circuit or oscillator is provided which includes translating means in the form of a load transformer having magnetic core means connected for magnetization from a direct input quantity through a pair of electrical paths which provide opposing directions of magnetization of the core means. A separate switch device is included in each of the paths having operating conditions which are transferable in phase opposition relative to each other. The core means includes output winding means for supplying to a suitable load device an alternating output quantity having a rectangular wave pattern with a frequency which is substantially independent of the magnitude of the input quantity.

In order to control the operation of the switch devices the invention provides switch operating means including a switching transformer having a magnetic core with input winding means linking the core connected for energization from the direct input quantity. The switching transformer further includes biasing winding means linking the core in inductive relation with the input winding means for supplying biasing voltages to the switch devices for controlling operation of the switch devices.

The switch operating means includes further control means for controlling energization of the input winding means of the switching transformer. Such control means is effective to periodically reverse the direction of energization of the input winding means of the switching transformer to thereby effect periodic reversal of the polarities of the biasing voltages applied to the switching devices.

In a preferred embodiment of the invention, the control means is in the form of a condenser which is connected in the path of energization of the input winding means of the switching transformer. The arrangement is such that the condenser is charged in response to energization of one of the electrical paths to terminate a first direction of energization of the input winding means of the switching transformer. Subsequent to such termination the condenser discharges through the input winding means to effect an opposing direction of energization of the input winding means for effecting the switching of the operating conditions of the switch devices whereby the other electrical path becomes energized. This action repeats itself for energization of the other path with the result that an alternating voltage quantity appears across the output terminals of the load transformer.

With this arrangement, it is observed that the frequency of the alternating output quantity is primarily dependent upon the time constant of the condenser charging circuit. Such frequency is further observed to be substantially independent of the magnitude of the direct input quantity. In the present invention the frequency may be varied over a considerable range by providing an adjustable condenser to thereby permit variation of the time constant.

In a preferred embodiment of the invention the switch devices are in the form of transistors which are controlled by the biasing potentials derived from the biasing winding means of the switching transformer. With this arrangement, the time constant of the switching circuit is determined by the value of the control condenser and by the magnitude of the base resistance of the transistor which is reflected into the condenser charging circuit.

It is therefore an object of the invention to provide an electrical inverter circuit of improved construction.

It is another object of the invention to provide a self-excited inverter circuit of improved construction for producing an alternating output quantity from a direct input quantity wherein the output quantity has a frequency substantially independent of the magnitude of the input quantity.

It is a further object of the invention to provide a self-excited inverter circuit for producing an alternating output quantity from a direct input quantity including a pair of switch devices having operating conditions controlled by a switching transformer energized from the input quantity through a condenser wherein the frequency of the output quantity is primarily dependent upon the time constant of the condenser charging circuit.

Other objects of the invention will become apparent from the following description taken in conjunction with the accompanying drawing in which the single figure is a circuit diagram illustrating an electrical inverter circuit embodying the teachings of the invention.

Referring to the drawing, there is illustrated an electrical inverter circuit represented generally by the numeral 1 embodying the teachings of the present invention. The circuit 1 includes a source of uni-directional voltage which is represented by a battery 3 for providing a uni-directional input quantity which is to be inverted.

The source 3 may comprise any suitable source of uni-directional voltage having either a constant or variable magnitude. The battery 3 is shown as including a positive terminal 5 and a negative terminal 7. A suitable load device schematically represented by the block 9 is shown associated with the circuit 1 for energization in accordance with the alternating output quantity of the circuit.

The circuit 1 includes translating means shown in the form of a transformer 11 having a magnetic core 13 constructed of any suitable magnetic material such as silicon steel. In order to permit magnetization of the core 13 a suitable input winding 15 is provided to link the core 13 having end terminals 17 and 19. The winding 15 is further provided with a center tap connection 21 to divide the winding 15 into two sections 23 and 25.

An output winding 27 is also provided to link the core 13 in inductive relation with the winding 15 for supplying an alternating output quantity to the load device 9. The winding 27 includes output terminals 29 and 31 connected to the load device 9 to permit energization of the load device in accordance with voltage induced in the winding 27 in response to energization of the winding 15.

In order to permit energization of the winding 15 from the source 3 for causing the induction of an alternating output voltage in the winding 27, a pair of electrical paths 33 and 35 is provided to connect the winding sections 23 and 25 for energization from the source 3 to provide opposing directions of magnetization of the core 13. As illustrated in the drawing, the section 23 in included in the path 33 whereas the section 25 is included in the path 35.

For the purpose of controlling energization of the sections 23 and 25 from the source 3 a pair of switch devices 37 and 39 are included respectively in the paths 33 and 35. The devices 37 and 39 may assume any suitable form, for example, the devices 37 and 39 may comprise electroresponsive valve devices such as three electrode vacuum tubes. Preferably, however, the devices 37 and 39 are in the form of three electrode junction transistor devices. Although the transistors 37 and 39 are illustrated in the form of p-n-p transistors, transistors of the n-p-n type may be utilized if desired. As shown in the drawing, the transistor 37 includes an emitter electrode 41, a collector electrode 43 and a base electrode 45. In a similar manner the transistor 39 includes an emitter electrode 47, a collector electrode 49 and a base electrode 51.

In the present invention, the transistors 37 and 39 are biased to operate as controlled switch devices so that each transistor has a closed operating condition wherein the transistor exhibits a very low impedance between the emitter and collector electrodes, and an open operating condition wherein the transistor exhibits a very high impedance between the emitter and collector electrodes. The circuit through the emitter and collector forms a load current controlling circuit. Such impedance conditions may be established by the application of suitable biasing voltages between one of the emitter and collector electrodes and the base electrode of the transistors. The circuit between the base electrode and the one of the emitter and collector electrodes as the case may be is the transistor control circuit. Further details of the operation of transistors as controlled switch devices may be found in U.S. Patent 2,783,384 which is assigned to the assignee of the present invention.

As shown in the drawing, the emitter and collector electrodes of the transistors 37 and 39 are included respectively in the paths 33 and 35. To this end the emitter electrode 41 of the transistor 37 is connected to the positive terminal 5 of the source 3. The collector electrode 43 is connected to the terminal 17 of the winding 15 with the center tap connection 21 of the winding 15 connected to the negative terminal 7 of the source 3. In a similar manner the emitter electrode 47 of the transistor 39 is connected to the positive terminal 5 with the collector electrode 49 connected to the terminal 19 of the winding 15.

In order to control operation of the transistors 37 and 39 switch operating means including a switching transformer is provided in accordance with the invention. The switching transformer is represented generally by the numeral 53 and includes a magnetic core 55 which may be constructed of any suitable magnetic material such as silicon steel. In order to effect magnetization of the core 55 a suitable input winding 57 is provided to link the core 55. The core 55 is designed so that it does not saturate within the range of energization of the winding 57. The transformer 53 also includes a pair of biasing windings 59 and 61 which link the core 55 in inductive relation with the winding 57. The winding 57 includes input terminals 63 and 65 which are connected for energization from the source 3 as will appear hereinafter.

In order to supply biasing voltages to the transistors the windings 59 and 61 include output terminals which are connected to electrodes of the transistors. As shown in the drawing, the winding 59 includes output terminals 67 and 69 which are connected respectively to the emitter electrode 41 and the base electrode 45 of the transistor 37. In a similar manner the winding 61 includes output terminals 71 and 73 which are connected respectively to the base electrode 51 and the emitter electrode 47 of the transistor 39. As will appear hereinafter, such connections permit the application of biasing voltages induced in the windings 59 and 61 in response to energization of the winding 57 to the transistors for establishing opposing operating conditions of the transistors. The operating condition of each transistor is determined by the polarity of the voltage applied thereto from the windings 59 and 61. Consequently, if the polarities of such applied voltages are reversed periodically the operating conditions of the transistors may be correspondingly periodically reversed.

In order to control energization of the winding 57 for effecting periodic reversals of the voltages applied by the windings 59 and 61, the invention provides control means illustrated in the form of a condenser 75 which is connected in the path of energization of the winding 57. As shown in the drawing, the condenser 75 is connected between the terminal 63 of the winding 57 and the input terminal 17 of the winding 15. The terminal 65 of the winding 57 is connected directly to the input terminal 19 of the winding 15. With this arrangement the condenser 75 is connected in series with the winding 57 with this series circuit connected in parallel circuit relation with the winding 15.

The operation of the circuit 1 may now be described. When the source 3 is connected in the circuit 1, it has been observed that one of the transistors 37 and 39 will eventually assume a current conducting condition. For purposes of discussion, it will be assumed that the transistor 37 is initially in a conducting condition and that the transistor 39 is in a non-conducting condition.

For this condition then a substantial portion of current from the source 3 flows from the positive terminal 5 through the emitter electrode 41, the collector electrode 43 and the winding section 23 back to the negative terminal 7 of the source 3. Such current flow through the winding section 23 establishes a magnetomotive force which directs magnetic flux through the core 13 effective to induce a voltage in the winding 27 having a polarity as indicated by the associated plus and minus signs.

At the same time a portion of current from the source 3 also flows from the positive terminal 5 of the battery 3 through the emitter electrode 41, the collector electrode 43, the condenser 75, the winding 57 and the winding section 25 back to the negative terminal 7. This current flow through the winding 57 is effective to induce voltages in the windings 57, 59 and 61 having polarities as indicated by the associated plus and minus signs. The voltages so induced in the windings 59 and 61 have polarities such that the transistor 37 is maintained in a conducting condition and the transistor 39 is maintained in a non-conducting condition.

After the elapse of a preselected time determined by the time constant of the charging circuit for the condenser 75, the condenser will be substantially fully charged with the polarity shown with the result that current flowing through the winding 57 drops to substantially a zero value. Such current drop results in a corresponding drop in the magnitudes of voltages induced in the windings 57, 59 and 61 to substantially zero values. This voltage reduction causes the transistor 37 to approach a non-conducting condition with the result that the voltage across the terminals 17 and 19 decreases to a value less than the magnitude of voltage across the condenser 75.

When this situation occurs the condenser 75 is discharged through a path which may be traced from the positive side of the condenser to thet erminal 17, the winding 15, the terminal 19 and the winding 57 back to the negative side of the condenser. The discharge current flowing through this path effects energization of the winding 57 in a direction which is opposite to the direction of energization of the winding 57 produced by a conductive condition of the transistor 37. As a result of this, a magnetomotive force is established which directs magnetic flux through the core 55 in a direction which is opposite to the direction of flux flow resulting when the transistor 37 is in a conductive condition. The establishment of this flux flow results in the induction of voltages in the windings 57, 59 and 61 having polarities opposite to those illustrated. Consequently, the transistor 37 is now in a non-conducting condition whereas the transistor 39 assumes a conducting condition. The cycle of events above described is now repeated for a conductive condition of the transistor 39. During this cycle a voltage is induced in the winding 27 having a polarity opposite to that shown.

The arrangement is such that the paths 33 and 35 are alternately in conductive and non-conductive conditions with the result that an alternating voltage is induced in the winding 57 having a rectangular wave pattern with a frequency dependent upon the frequency of charging of the condenser 75. The frequency of such condenser charging is determined by the time constant of the condenser charging circuit. Such time constant is dependent upon the magnitude of the capacitance exhibited by the condenser and also upon the magnitude of resistance present in the charging circuit. Such resistance is observed to consist primarily of the base resistance of the conducting transistor which is reflected into the condenser charging circuit.

It is noted therefore that the frequency of the alternating output quantity appearing across the terminals 29 and 31 is dependent to a large extent upon the time constant of the condenser charging circuit and is substantially independent of the magnitude of voltage of the source 3. The frequency of the alternating output voltage may be varied by providing a condenser having an adjustable capacitance. This arrangement permits an adjustment of the time constant of the charging circuit to thereby permit a variation of the frequency of the output quantity.

The substantially constant frequency characteristics of the circuit 1 as well as the ability to readily charge the frequency over a substantial range provides advantages in many appliactions. Another advantage of the circuit 1 is that the employment of expensive saturating magnetic cores heretofore utilized to effect the switching functions are not required.

Although the invention has been described with reference to certain specific embodiments thereof, numerous modifications are possible and it is desired to cover all modifications falling within the spirit and scope of the invention.

We claim as our invention:

1. In an electrical system, an electrical apparatus, a pair of terminals adapted to be energized from a source of unidirectional voltage, a low impedance power path connecting said apparatus to said terminals, an electroresponsive semiconductor valve device having a pair of main electrodes, and a control electrode, said main electrodes of said device being included in said path, said device being operable to establish a conductive condition between said main electrodes for a preselected polarity and magnitude of voltage between one electrode of said pair of main electrodes and said control electrode and being operable to establish a substantially nonconductive condition of said path for a second preselected polarity and magnitude of voltage between said one main electrode and said control electrode, a magnetic core, an input winding linking the core, said input winding being operatively connected across said terminals in series with said main electrodes and in shunt with said apparatus, a control winding linking the core in inductive relation with said input winding, said control winding being connected between said one main electrode and said control electrode, said control winding being proportioned and poled relative to the input winding such that voltage induced in the control winding in response to energization of said input winding due to said device being in its said conductive condition is applied to said device with said preselected polarty and magnitude, and a condenser connected in series circuit relation with said input winding for charging by the current flow through said input winding, said condenser being effective when charged to terminate energization of said input winding for providing a voltage of said second preselected polarity and magnitude between said one main electrode and said control electrode.

2. In a power inverter, a translating device having a plurality of terminals, a transformer having an input winding and first and second control windings, a first and a second electroresponsive semiconductor valve device, each said semiconductor device having a main power circuit and a control circuit, a pair of source terminals adapted to be energized from a source of unidirectional potential, a first low impedance power current path including said main circuit of said first valve device connecting said source terminals to a pair of said terminals of said translating device, a second low impedance power current path including said main circuit of said second valve device connecting said source terminals to a first and a second of said terminals of said translating device, a capacitor, a circuit comprising said capacitor and said input winding connected in series, means connecting said last-named circuit across two of said terminals of said translating device, means connecting said control circuit of said first valve device across said first control winding and polarized to maintain said first valve device in a conducting condition during the time interval in which said capacitor is being charged by current flow through said first valve device, and means connecting said control circuit of said second valve device across said second control winding and polarized to maintain said second valve device in a conducting condition during the time interval in which said capacitor is being charged by current flow through said second valve device.

3. In a power inverter, a pair of input power terminals adapted to be energized from a source of unidirectional potential, a load supplying transformer having a primary winding with end terminals and an intermediate terminal, a control transformer having an input winding with a pair of terminals and first and second control windings, first and second transistors, each said transistor having a main power circuit and a control circuit, a capacitor having a pair of terminals, a first low impedance power current path including said main power circuit of said first transistor connecting one of said power terminals to one of said end terminals and connecting said one power terminal to one of said pair of terminals of said capacitor, a second low impedance power current path including said main power circuit of said second transistor connecting said one power terminal to the other of said end terminals and connecting said one power terminal to one of said terminals of said input winding, a third current path connecting the other of said terminals of said capacitor to the other of said terminals of said input winding, a fourth current path connecting said first control winding to said control circuit of said first valve device in such polarity that the potential established by said first control winding in said control circuit of said first valve device during charging of said capacitor due to conduction of said first valve device causes said first valve device to remain conductive, a fifth current path connecting said second control winding to said control circuit of said second valve device in such polarity that the potential established by said first control winding in said control circuit of said second valve device during charging of said capacitor due to conduction of said second valve device causes said second valve device to remain conductive, and a sixth power current path connecting the other of said power terminals to said intermediate terminal.

References Cited in the file of this patent

UNITED STATES PATENTS

| | | |
|---|---|---|
| 2,055,208 | Rumpel | Sept. 22, 1936 |
| 2,540,275 | Mittlemann | Feb. 6, 1951 |
| 2,750,502 | Gray | June 12, 1956 |
| 2,782,309 | Aasma | Feb. 19, 1957 |
| 2,783,384 | Bright et al. | Feb. 26, 1957 |
| 2,809,303 | Collins | Oct. 8, 1957 |
| 2,883,539 | Bruck et al. | Apr. 21, 1959 |